United States Patent
Tsai

(10) Patent No.: US 12,405,886 B2
(45) Date of Patent: Sep. 2, 2025

(54) METHOD AND NON-TRANSITORY COMPUTER-READABLE STORAGE MEDIUM AND APPARATUS FOR GARBAGE COLLECTION WITH DETERMINED HOST-ADDRESS TO FLASH-ADDRESS MAPPING (H2F) SUB-TABLES IN FLASH MEMORY DEVICE

(71) Applicant: Silicon Motion, Inc., Zhubei (TW)

(72) Inventor: Cheng-Yu Tsai, Kaohsiung (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 18/612,578

(22) Filed: Mar. 21, 2024

(65) Prior Publication Data

US 2025/0252051 A1 Aug. 7, 2025

(30) Foreign Application Priority Data

Feb. 2, 2024 (CN) .......................... 202410152890.1

(51) Int. Cl.
*G06F 12/02* (2006.01)
(52) U.S. Cl.
CPC ...... *G06F 12/0253* (2013.01); *G06F 12/0246* (2013.01); *G06F 12/0292* (2013.01)
(58) Field of Classification Search
CPC ............. G06F 12/0253; G06F 12/0246; G06F 12/0292
See application file for complete search history.

(56) References Cited

U.S. PATENT DOCUMENTS

| 7,610,437 | B2 * | 10/2009 | Sinclair | ................. | G06F 3/0652 |
| | | | | | 711/104 |
| 7,984,084 | B2 * | 7/2011 | Sinclair | ............... | G06F 16/1847 |
| | | | | | 707/818 |
| 8,285,918 | B2 * | 10/2012 | Maheshwari | ........ | G11C 7/1072 |
| | | | | | 711/159 |

(Continued)

FOREIGN PATENT DOCUMENTS

| TW | 202203009 A | 1/2022 |
| TW | 202203014 A | 1/2022 |
| TW | 202225979 A | 7/2022 |

*Primary Examiner* — Christopher D Birkhimer
(74) *Attorney, Agent, or Firm* — Birch, Stewart, Kolasch & Birch, LLP

(57) ABSTRACT

The invention introduces a method for garbage collection (GC) in a flash memory device, performed by a processing unit, includes: finding a source block (SBLK) associated with a hit accumulated valid page count (VPC) that is the first one exceeding a total number of physical pages in one destination block (DBLK); labeling the found SBLK and its subsequent SBLKs as first-type SBLKs; labeling the other SBLKs as second-type SBLKs; obtaining Host-address To Flash-address mapping (H2F) sub-tables corresponding to valid pages stored in the second-type SBLKs; in the scanning for each H2F sub-table, detecting valid pages stored in the first-type and the second-type SBLKs, and appending records into a GC table for the valid pages; and reprogramming user data of a designated physical page in a designated first-type or second-type SBLK into a designated physical page in the DBLK according to each record in the GC table.

20 Claims, 10 Drawing Sheets

(56) References Cited

U.S. PATENT DOCUMENTS

| | | | | |
|---|---|---|---|---|
| 8,443,263 | B2* | 5/2013 | Selinger | G06F 11/1068 |
| | | | | 714/768 |
| 8,873,284 | B2* | 10/2014 | Sinclair | G06F 12/0246 |
| | | | | 365/185.11 |
| 9,223,693 | B2* | 12/2015 | Sinclair | G06F 12/0246 |
| 9,336,133 | B2* | 5/2016 | Sinclair | G06F 12/0246 |
| 9,348,746 | B2* | 5/2016 | Sinclair | G06F 12/0246 |
| 9,465,731 | B2* | 10/2016 | Sinclair | G06F 12/0246 |
| 9,652,382 | B1* | 5/2017 | Subramanian | G06F 12/0253 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,430,279 | B1* | 10/2019 | Dittia | G06F 3/0656 |
| 10,739,996 | B1* | 8/2020 | Ebsen | G06F 16/1727 |
| 10,795,812 | B1* | 10/2020 | Duggal | G06F 3/067 |
| 10,983,715 | B2* | 4/2021 | Sharoni | G06F 21/79 |
| 11,086,537 | B2* | 8/2021 | Byun | G06F 12/0253 |
| 2007/0033325 | A1* | 2/2007 | Sinclair | G06F 3/0608 |
| | | | | 711/170 |
| 2008/0082596 | A1* | 4/2008 | Gorobets | G06F 12/0253 |
| 2008/0189477 | A1* | 8/2008 | Asano | G06F 12/0246 |
| | | | | 711/E12.008 |
| 2011/0145473 | A1* | 6/2011 | Maheshwari | G11C 7/1072 |
| | | | | 711/E12.008 |
| 2011/0161784 | A1* | 6/2011 | Selinger | G06F 11/1016 |
| | | | | 714/E11.002 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2015/0227602 | A1* | 8/2015 | Ramu | G06F 11/1456 |
| | | | | 707/634 |
| 2016/0246713 | A1* | 8/2016 | Choi | G06F 3/0608 |
| 2017/0123655 | A1* | 5/2017 | Sinclair | G06F 3/061 |
| 2017/0242790 | A1* | 8/2017 | O'Krafka | G06F 3/0652 |
| 2018/0189175 | A1* | 7/2018 | Ji | G06F 3/0679 |
| 2020/0089420 | A1* | 3/2020 | Sharoni | G06F 21/79 |
| 2020/0192794 | A1* | 6/2020 | Lee | G06F 12/0246 |
| 2020/0218653 | A1* | 7/2020 | Ryu | G06F 12/0253 |
| 2020/0310686 | A1* | 10/2020 | Truong | G06F 3/061 |
| 2021/0342362 | A1* | 11/2021 | Haravu | G06F 11/1464 |
| 2021/0406216 | A1* | 12/2021 | Komatsu | G06F 16/11 |
| 2022/0011975 | A1 | 1/2022 | Wu | |
| 2022/0011976 | A1 | 1/2022 | Wu | |
| 2022/0019547 | A1 | 1/2022 | Shih | |
| 2024/0202114 | A1* | 6/2024 | Tang | G06F 12/0246 |

* cited by examiner

METHOD AND NON-TRANSITORY COMPUTER-READABLE STORAGE MEDIUM AND APPARATUS FOR GARBAGE COLLECTION WITH DETERMINED HOST-ADDRESS TO FLASH-ADDRESS MAPPING (H2F) SUB-TABLES IN FLASH MEMORY DEVICE

CROSS-REFERENCE TO RELATED APPLICATIONS

This application claims the benefit of priority to Patent Application No. 202410152890.1, filed in China on Feb. 2, 2024; the entirety of which is incorporated herein by reference for all purposes.

BACKGROUND

The disclosure generally relates to storage devices and, more particularly, to a method, a non-transitory computer-readable storage medium and an apparatus for garbage collection in a flash memory device.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

After numerous accesses, a physical page may include valid and invalid pages (also referred to as stale pages), in which the valid pages store valid user data while the invalid pages store invalid (old) user data. When detecting that available space of a storage device is lower than a threshold, a flash controller may issue read instructions to direct the storage device to read and collect user data of the valid pages of one or more physical blocks (also referred to as source blocks), and then, issue write instructions to direct the storage device to program the collected user data into empty physical pages of an spare or active block (also referred to as destination blocks), thereby making the data block storing no valid user data be able to erase to become spare blocks. The data block after being erased provides space for storing more data. The above steps are referred to as a Garbage Collection (GC) process. However, a poorly-designed GC process would degrade the overall performance of the storage device. Thus, it is desirable to have a computer-readable storage medium, a method, and an apparatus for GC in a flash memory device to optimize the release efficiency of source blocks.

SUMMARY

In an aspect of the invention, an embodiment introduces a method for GC in a flash memory device, performed by a processing unit, to include the following steps: sorting data blocks according to valid page counts (VPCs) of the data blocks and selecting a preset number of sorted data blocks starting from the data block with the smallest VPC as source blocks (SBLKs); finding the SBLK associated with a hit accumulated VPC that is the first one exceeding a total number of physical pages in one destination block (DBLK) according to a plurality of accumulated VPCs in ascending order; labeling a found SBLK and its subsequent SBLKs as first-type SBLKs; labeling the SBLKs other than the first-type SBLKs as second-type SBLKs; obtaining one or more host-address to flash-address mapping (H2F) sub-tables corresponding to first valid pages stored in the second-type SBLKs; in a scanning for each H2F sub-table, detecting second valid pages stored in the first-type SBLKs and the second-type SBLKs in an order of logical addresses of this H2F sub-table and appending records to a garbage collection (GC) table for the second valid pages, wherein each record stores information indicating that user data of a designated physical page in a designated first-type SBLK or a designated second-type SBLK to be programmed into a designated physical page of the DBLK; and reprogramming the user data of the designated physical page in the designated first-type SBLK or the designated second-type SBLK into the designated physical page of the DBLK according to each record of the GC table, thereby enabling the second-type SBLKs after being erased to store new user data.

In another aspect of the invention, an embodiment introduces a non-transitory computer-readable storage medium having stored therein program code that, when loaded and executed by a processing unit, causes the processing unit to perform the method for GC in a flash memory device as described above.

In still another aspect of the invention, an embodiment introduces an apparatus for GC in a flash memory device, to include: a flash interface (I/F), coupled to a flash module; and a processing unit, coupled to the flash I/F. The processing unit is arranged operably to: sort data blocks according to VPCs of the data blocks and select a preset number of sorted data blocks starting from the data block with the smallest VPC as SBLKs; find the SBLK associated with a hit accumulated VPC that is first one exceeding a total number of physical pages in one DBLK according to accumulated VPCs in ascending order; label a found SBLK and its subsequent SBLKs as first-type SBLKs; label the SBLKs other than the first-type SBLKs as second-type SBLKs; obtain one or more H2F sub-tables corresponding to first valid pages stored in the second-type SBLKs; in a scanning for each H2F sub-table, detect second valid pages stored in the first-type SBLKs and the second-type SBLKs in an order of logical addresses of this H2F sub-table and append records to a GC table for the second valid pages, wherein each record stores information indicating that user data of a designated physical page in a designated first-type SBLK or a designated second-type SBLK to be programmed into a designated physical page of the DBLK; and drive the flash I/F to reprogram the user data of the designated physical page in the designated first-type SBLK or the designated second-type SBLK into the designated physical page of the DBLK in the flash module according to each record of the GC table, thereby enabling the second-type SBLKs after being erased to store new user data.

A total number of the records in the GC table, which are associated with the first-type SBLKs, is less than or equal to a difference subtracting a total number of VPCs of the second-type SBLKs from the total number of physical pages in the DBLK.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
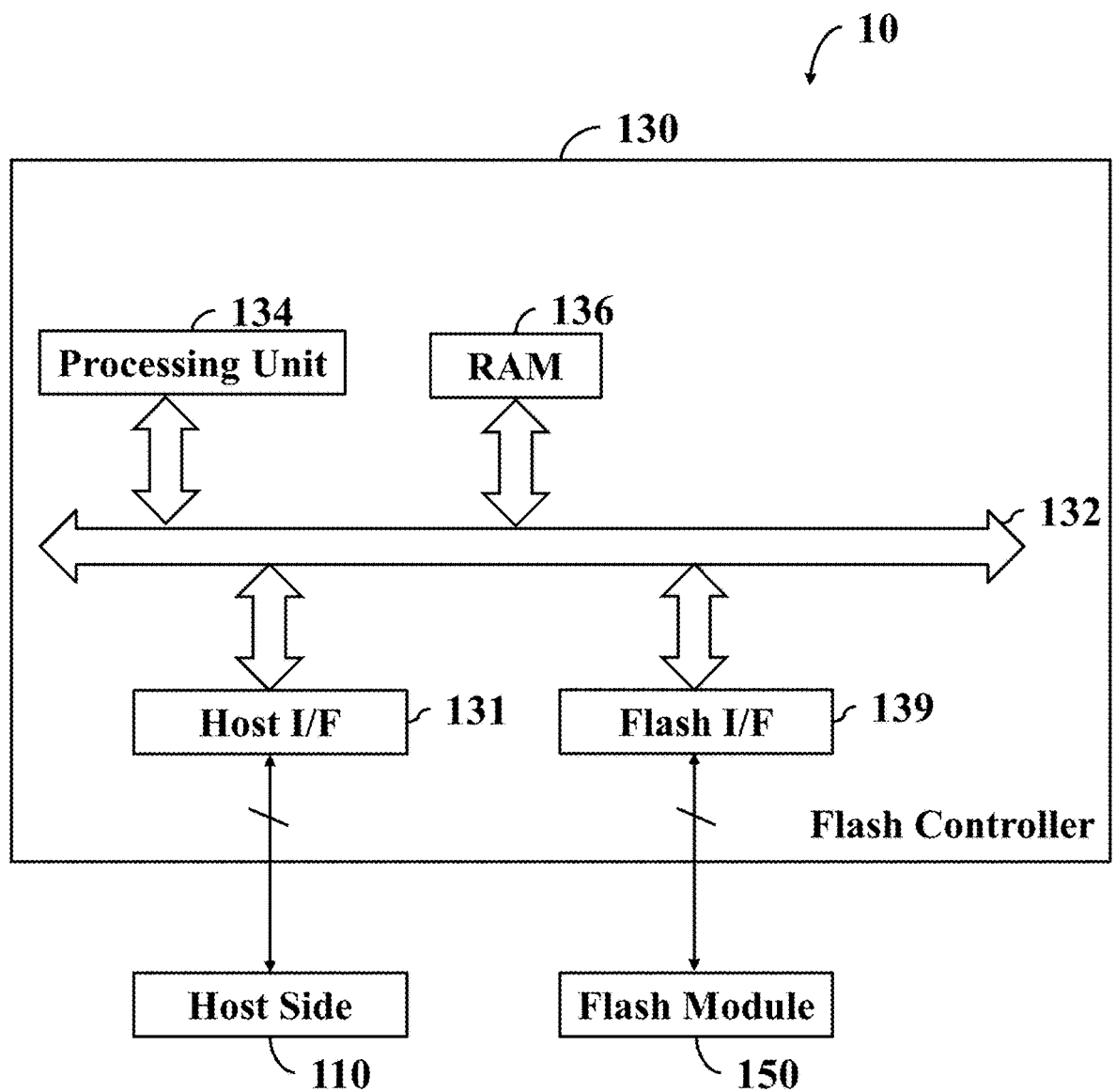
FIG. 1 is the system architecture of an electronic apparatus according to an embodiment of the invention.

Refer to FIG. 1. The electronic apparatus 100 includes the host side 110, the flash controller 130 and the flash module 150, and the flash controller 130 and the flash module 150 may be collectively referred to as a device side. The electronic apparatus 100 may be equipped with a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, host-address to flash-address mapping (H2F) tables, flash-address to host-address mapping (F2H) tables, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
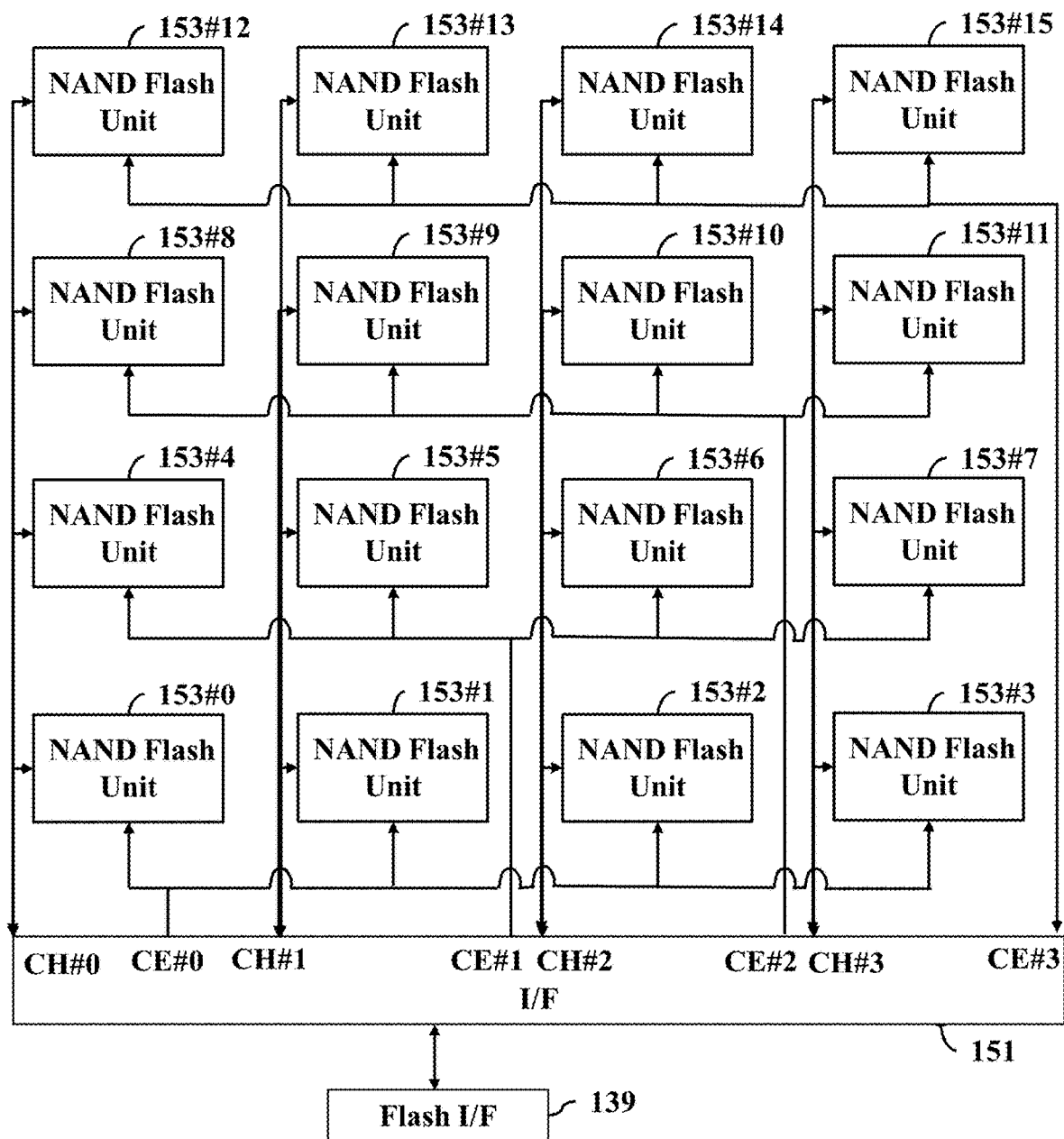
FIG. 2 is a schematic diagram illustrating a flash module according to an embodiment of the invention.

Refer to FIG. 2. The I/F 151 of the flash module 150 may include four I/O channels (hereinafter referred to as channels) CH#0 to CH#3 and each is connected to four NAND flash units, for example, the channel CH#0 is connected to the NAND flash units 150#0, 150#4, 150#8 and 150#12. Each NAND flash unit can be packaged in an independent die. The flash I/F 139 may issue one of the CE signals CE#0 to CE#3 through the I/F 151 to activate the NAND flash units 153#0 to 153#3, the NAND flash units 153#4 to 153#7, the NAND flash units 153#8 to 153#11, or the NAND flash units 153#12 to 153#15, and read data from or program data into the activated NAND flash units in parallel.

Figure 3:
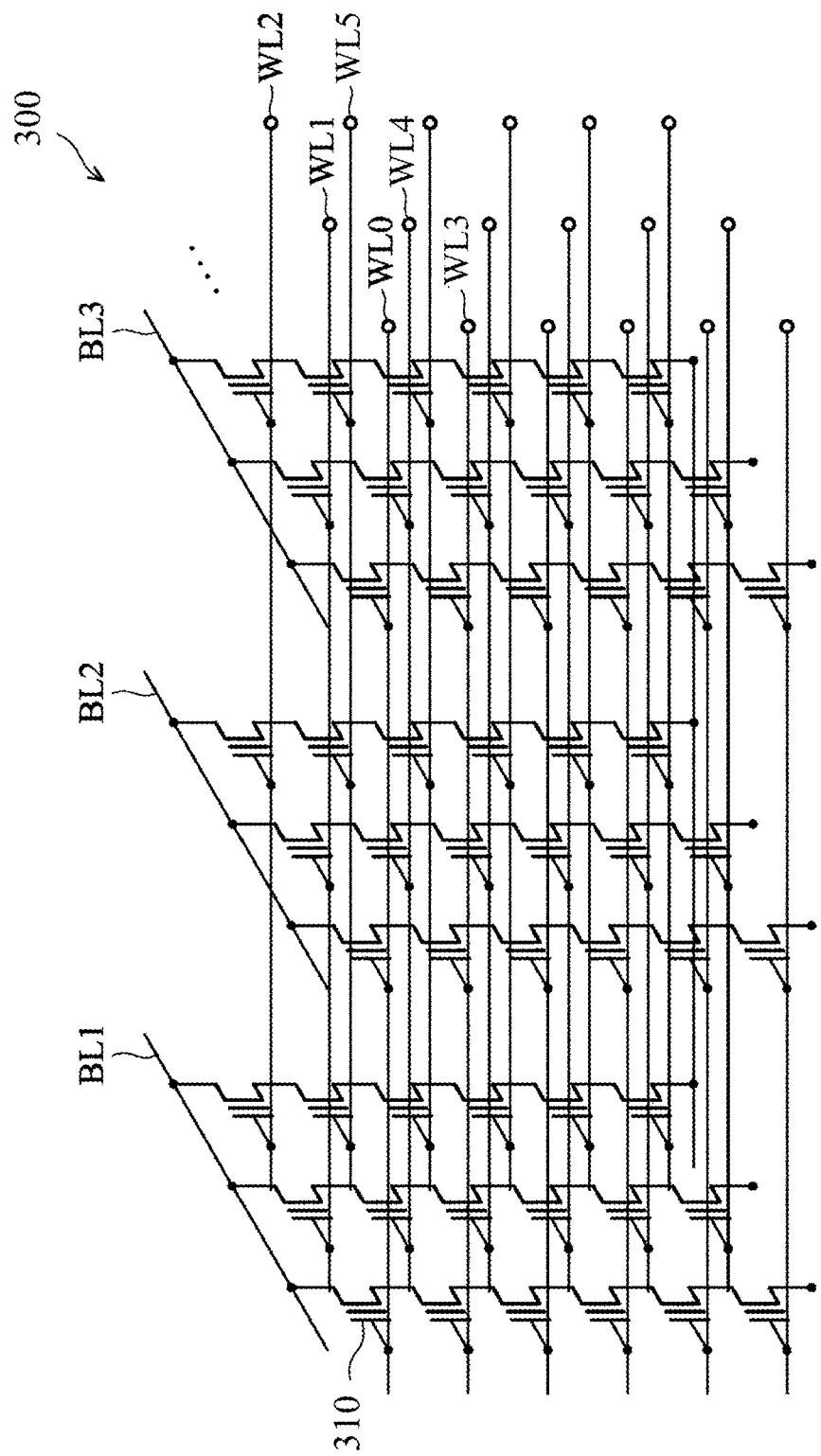
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on the word lines WL0 to WL2 and WL3 to WL5 form two pages for storing data of two pages, respectively.

Each NAND flash unit may include multiple data planes, each data plane may include multiple physical blocks. In order to improve the data programming and data reading efficiency, designated physical blocks of the data planes in multiple NAND flash units are organized into one super block (SB), so that each SB contains multiple physical pages. The SB and the physical page are identified by a super-block number and a page number, respectively, and the combination is referred to as a physical address of the flash module 150.

Each SB is labeled as a data block or a current block according to its function. The processing unit 134 may select an empty SB as the current block for preparing to program user data received from the host side 110. In order to improve the efficiency of data programming, the user data provided by the host side 110 is programmed in parallel into designated physical blocks of the SB across multiple NAND flash units. The processing unit 134 maintains the F2H table for each current block. Each F2H table contains multiple records. Each record stores the information indicating which logical address of user data that is associated with (or mapped by) each physical page in the current block. The records in the F2H table are stored in the order of the page numbers of physical pages in the current block. The logical address may be expressed in a logical block address (LBA), a host page number or other expression and is managed by the host side 110. For example, each LBA or host page is associated with the user data in 4K bytes. The processing unit 134 may drive the flash I/F 139 to program the corresponding F2H table in the RAM 136 into the data region of the designated physical page (for example, the last physical page) of one current block after all physical pages of this current block are fully stored in user data or the remaining physical pages of this current block are filled with dummy values. The current block is changed to the data block after the corresponding F2H table has been programmed into the flash module 150, and the user data stored in the data block cannot be modified. Since user data of the same logical addresses may be programmed into different physical pages in one current block at different time points, some physical pages of this current block may contain invalid data, so that the processing unit 134 calculates the valid page count (VPC) of this current block. Subsequently, the processing unit 134 selects another empty SB as a new current block.

In some embodiments, in addition to the corresponding F2H table, the processing unit 134 drives the flash I/F 139 to write the initial VPC into the metadata region of the designated physical page (for example, the last physical page) in one current block. In alternative embodiments, the processing unit 134 maintains a VPC table in the RAM 136 to store the VPCs of all data blocks. Each time a data block is generated, the processing unit 134 updates the content of the VPC table to append information about the new data block and its VPC. The processing unit 134 drives the flash I/F 139 to program the up-to-date VPC into the designated physical address of the flash module 150 after updating the VPC table for a predetermined number of data blocks.

Figure 4:
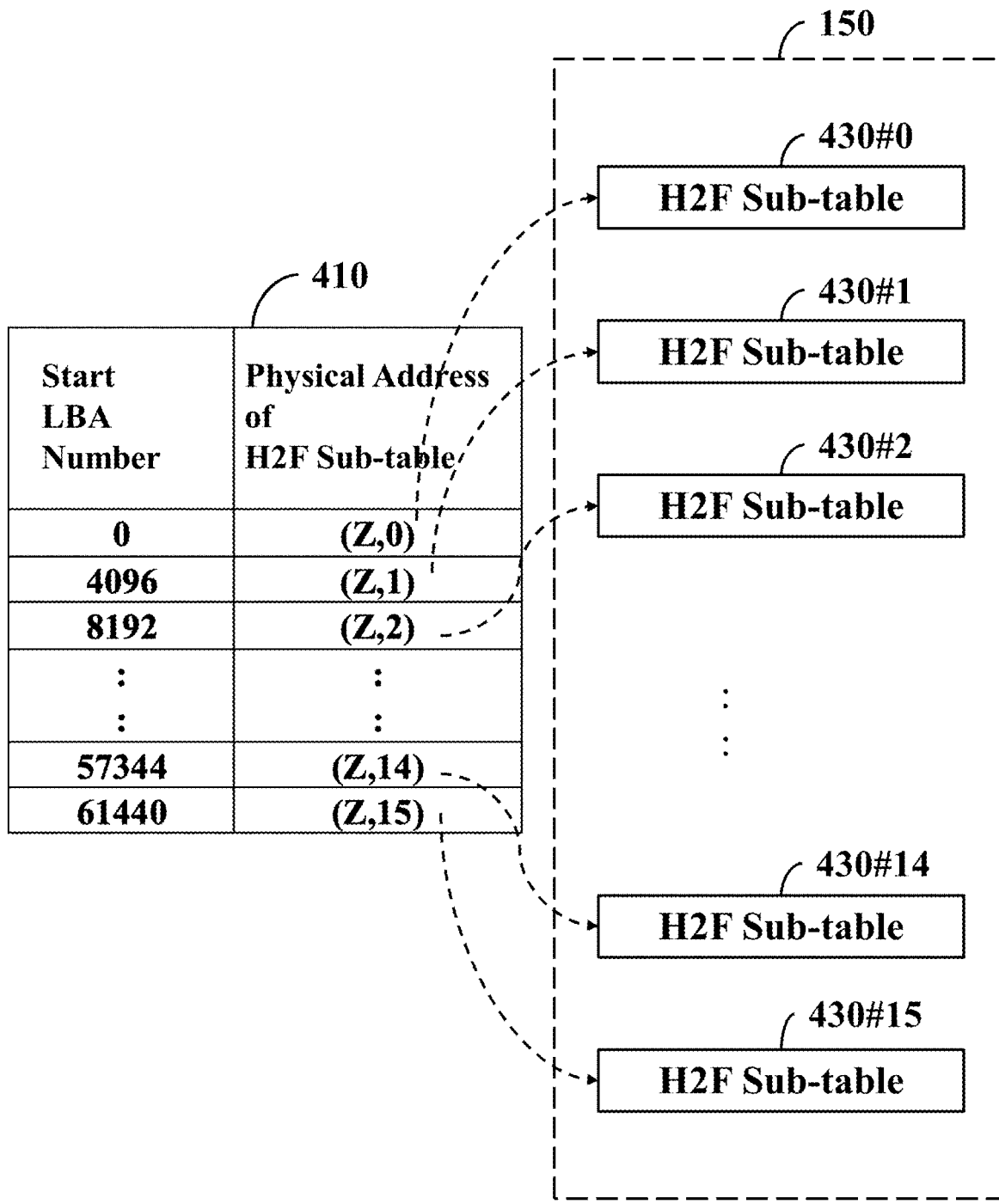
FIG. 4 is a schematic diagram showing the relationships between the high-level mapping table and the host-address to flash-address mapping (H2F) sub-tables according to an embodiment of the invention.

In addition to programming the F2H table into the designated physical page of the current block, the processing unit 134 updates the H2F table according to the content of F2H table, so that the processing unit 134 when executing host read commands searches the H2F table for the physical addresses user data of particular logical addresses are physically stored in later. The H2F table contains multiple records arranged in the order of the logical addresses and each record stores information indicating which physical address user data of the corresponding logical address is physically stored in. However, because the RAM 136 cannot provide enough space to store the whole H2F table for the processing unit 134, the whole H2F table is divided into multiple H2F sub-tables and the H2F sub-tables are stored in the flash module 150, so that only necessary H2F sub-table or sub-tables are read from the flash module 150 and stored in the RAM 136 for fast look-up when data read operations are performed in the future. Referring to FIG. 4. The whole H2F table is divided into H2F sub-tables 430#0~430#15. The processing unit 134 further maintains the high-level mapping table 410, which contains multiple records arranged in the order of the logical addresses. Each record stores information indicating which physical address the corresponding H2F sub-table for a designated logical address range is physically stored in. For example, the H2F sub-table 430#0 associated with the LBA#0 to LBA#4095 is stored in the 0th physical page of a designated SB (the letter "Z" represents the number of the designated SB), the H2F sub-table 430#1 associated with the LBA#4096 to the LBA#8191 is stored in the 1$^{st}$ physical page of the designated SB, and the remaining can be deduced by analogy. Although FIG. 4 shows 16 H2F sub-tables only, those artisans may modify the design to put more or less H2F sub-tables depending on the capacity of the flash module 150, and the invention should not be limited thereto.

Figure 5:
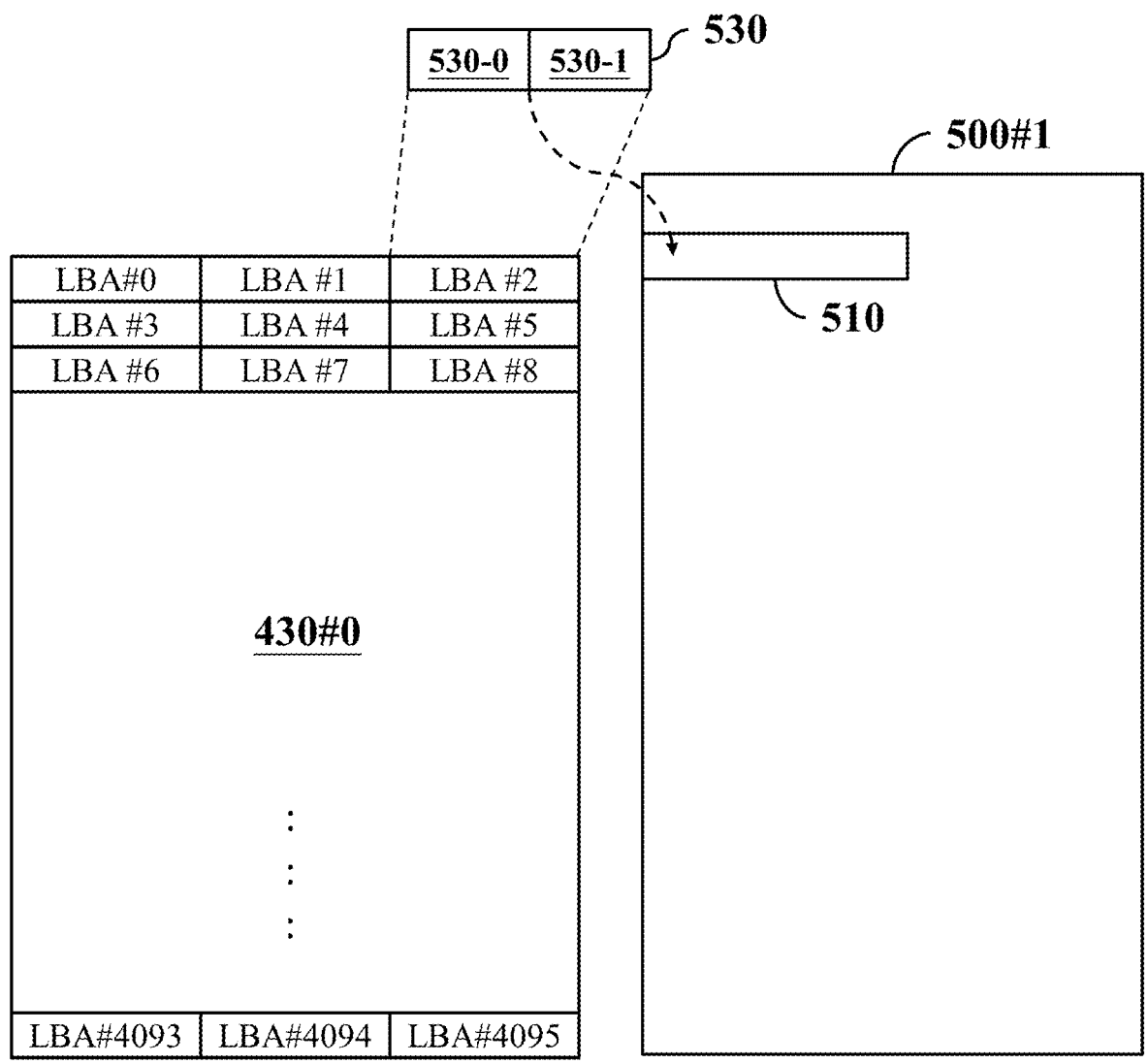
FIG. 5 is a schematic diagram showing the relationships between the H2F sub-table and the physical page according to an embodiment of the invention.

Space required by each H2F sub-table may be 1 KB, 2 KB, 4 KB, 8 KB, or others. Refer to FIG. 5. For example, the H2F sub-table stores physical-address information mapped from each logical address in the order of the logical addresses. Each logical address may be represented by an LBA number and each LBA number relates to a fixed physical storage-space, such as 4K bytes. Those artisans may use a host page number to represent the logical address and the invention should not be limited thereto. For example, the H2F sub-table 430#0 stores the physical-address information of LBA#0 to LBA#4095 sequentially. The Physical-address information 530 may be represented in four bytes: the two most-significant bytes 530-0 records a SB number and the two least-significant bytes 530-1 records a physical page number. For example, the physical-address information 530 corresponding to LBA#2 points to the physical page 510 of the SB 500#1. The bytes 530-0 records the number of the SB 500#1 and the bytes 530-1 records the number of the physical page 510.

In order to ensure that more data blocks can be released after performing a GC process, an embodiment of the present invention firstly considers the selection of source blocks (SBLKs), and secondly considers the concentration of LBAs. The whole GC process includes three stages: selection and sequence arrangement for SBLKs; arrangement of valid user data in destination blocks (DBLKs); and migration of valid user data and release of SBLKs.

Figure 6:
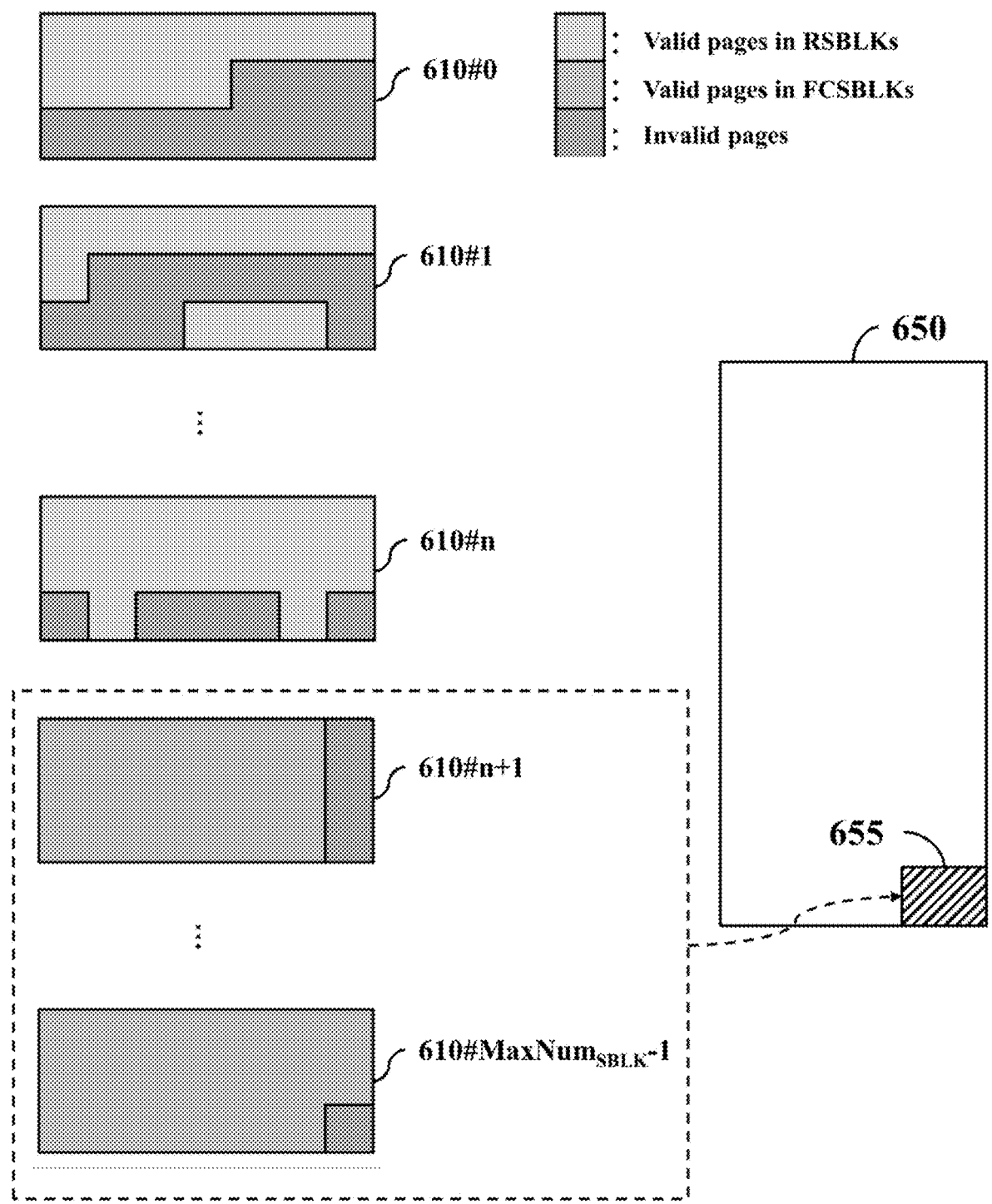
FIG. 6 is a schematic diagram showing released source blocks (RSBLKs), force clean source blocks (FCSBLKs) and a destination block (DBLK) according to an embodiment of the invention.

In the first stage, the flash controller 130 sorts the data blocks in ascending order according to their VPCs, and selects a preset number of the data blocks, $MaxNum_{SBLK}$, starting from the data block with the smallest VPC as the SBLKs. $MaxNum_{SBLK}$ is the constant to represent the maximum quantity of the SBLKs, such as 16. The flash controller 130 further finds the SBLK associated with a hit accumulated VPC that is the first one exceeding the total number of the physical pages in one DBLK in the ascending order of the accumulated VPCs, labels the found SBLK and its subsequent SBLKs as force clean source blocks (FCSBLKs) and labels the other SBLKs as released source blocks (RSBLKs). Refer to FIG. 6. The flash controller 130 may select $MaxNum_{SBLK}$ of data blocks 610#0 to 610#$MaxNum_{SBLK}$–1 starting from the data block 610#0 with the smallest VPC as SBLKs. The accumulated VPC for the data blocks 610#0 to 610#n is lower than or equal to the total number of the physical pages in one DBLK 650, $MaxP_{DBLK}$, but the accumulated VPC for the data blocks 610#0 to 610#n+1 exceeds $MaxP_{DBLK}$ in the DBLK 650, where n is an arbitrary integer ranging from 0 to $MaxNum_{SBLK}$–1. The data blocks 610#n+1 to 610#$MaxNum_{SBLK}$–1 are labled as FCSBLKs and the data blocks 610#0 to 610#n are referred to as RSBLKs. The DBLK 650 is a new current block used to program the user data in valid pages of the data blocks 610#0 to 610#$MaxNum_{SBLK}$–1. The user data in all valid pages of RSBLKs 610#0 to 610#n can be reprogrammed into the DBLK 650. The RSBLKs 610#0 to 610#n do not include any valid page after the user data in the all valid pages of the RSBLKs 610#0 to 610#n has been reprogrammed into the DBLK 650, thereby enabling the RSBLKs 610#0 to 610#n after being erased to store new user data. The remaining pages 655 in the DBLK 650 are provided for the user data in limited valid pages of the FCSBLKs 610#0 to 610#$MaxNum_{SBLK}$–1. The logical addresses corresponding to the selected valid pages of the FCSBLKs 610#0 to 610#$MaxNum_{SBLK}$–1 approximate to the logical addresses corresponding to the valid pages of the RSBLKs 610#0 to 610#n.

Figure 7:
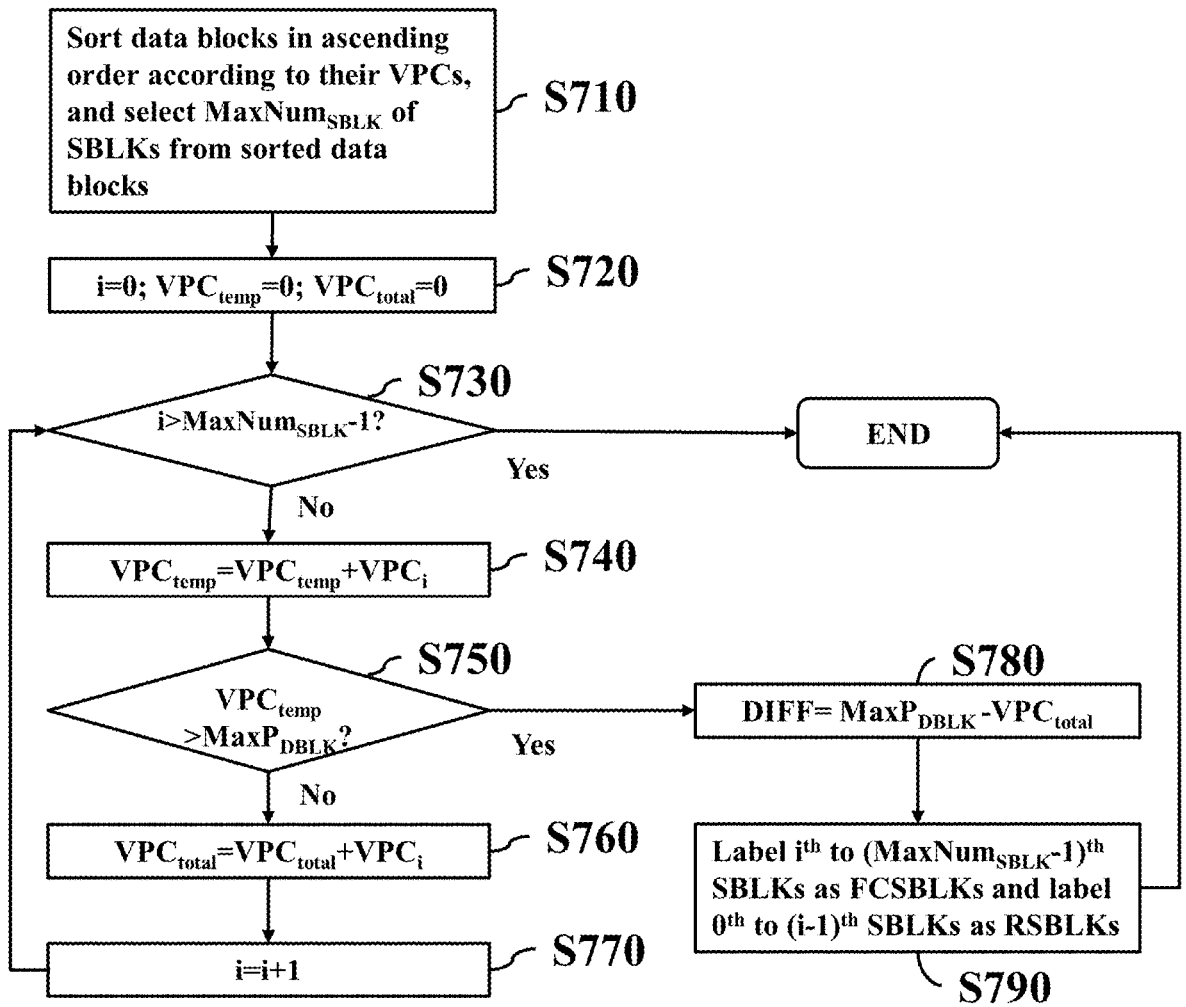
FIG. 7 is a flowchart illustrating a method for selecting SBLKs and arranging the sequence of the SBLKs, which is implemented in the first stage, according to an embodiment of the invention.

Refer to FIG. 7 illustrating a method for selecting SBLKs and arranging the sequence of the SBLKs, which is implemented in the first stage. The processing unit 134 when loading the executing program code of the firmware translation layer (FTL) selects SBLKs from the data blocks and labels each SBLK as the RSBLK or the FCSBLK. The details are as follows:

Step S710: The data blocks are sorted in ascending order according to their VPCs, and the preset number of the data blocks, $MaxNum_{SBLK}$ (e.g. 16), starting from the data block with the smallest VPC are selected as SBLKs. In some embodiments, the processing unit 134 may drive the flash I/F 139 to read the VPCs from the metadata region of the designated physical page (e.g. the last physical block) in each data block of the flash module 150. In alternative embodiments, the processing unit 134 may drive the flash I/F 139 to read the VPC table from the designated physical address of the flash module 150 and obtain the VPCs of all data blocks from the VPC table. Subsequently, the processing unit 134 sorts all data blocks in ascending order according to the obtained VPCs.

Step S720: The variables i, $VPC_{temp}$ and $VPC_{total}$ are set to 0. The processing unit 134 uses the variable i to record the specific number of the SBLK that is processed currently, and the variables $VPC_{temp}$ and $VPC_{total}$ to record the accumulated VPCs for the SBLK (s) processed until now. The processing unit 134 ensures that $VPC_{total}$ does not exceed that the maximum number of pages $MaxP_{DBLK}$ that can be programmed into one DBLK 650 in the entire process.

Step S730: It is determined whether the variable i is greater than the preset number $MaxNum_{SBLK}$ minus one. If so, it means that the user data in the valid pages of all SBLKs can be programmed into the DBLK 650 and the process ends. Otherwise, the process proceeds to step S740.

Step S740: $VPC_{temp}=VPC_{temp}+VPC_i$ is calculated, where $VPC_i$ indicates the VPC of the $i^{th}$ SBLK.

Step S750: It is determined whether the variable $VPC_{temp}$ is greater than the maximum number of pages, $MaxP_{DBLK}$, that can be programmed into one DBLK 650. If so, it means that VPCs accumulated to that of the $i^{th}$ SBLK have exceeded $MaxP_{DBLK}$, and the process proceeds to step S780. Otherwise, the process proceeds to step S760.

Step S760: $VPC_{total}=VPC_{total}+VPC_i$ is calculated, where $VPC_i$ indicates the VPC of the $i^{th}$ SBLK.

Step S770: The variable i is increased by one.

Step S780: $DIFF=MaxP_{DBLK}-VPC_{total}$ is calculated. The variable DIFF indicates the total number of remaining pages 655 of the DBLK 650.

Step S790: The $i^{th}$ to the $(MaxNum_{SBLK}-1)^{th}$ SBLK are labeled as FCSBLKs and the $0^{th}$ to the $(i-1)^{th}$ SBLK are labeled as RSBLKs. The processing unit 134 may store the tag information of the SBLKs in the RAM 136 for reference in subsequent stages. For example, suppose that $MaxNum_{SBLK}$ is set to 8. The processing unit 134 may store the exemplary SBLK table as shown in Table 1 in the RAM 136:

TABLE 1

| SB Number | Tag Information |
|---|---|
| 100 | RSBLK |
| 99 | RSBLK |
| 200 | RSBLK |
| 18 | RSBLK |
| 74 | RSBLK |
| 3 | FCSBLK |
| 25 | FCSBLK |
| 310 | FCSBLK |

The SBLK table contains eight records for storing the SB numbers and the table information of the $0^{th}$ to the $7^{th}$ SBLK. The $0^{th}$ to the $7^{th}$ records store that the SBs mapped by the eight SBLKs are SB#100, SB#99, SB#200, SB#18, SB#74, SB#3, SB#25 and SB#310 sequentially. The SBs are sorted from small to large according to their VPCs. The SBs SB#100, SB#99, SB#200, SB#18 and SB#74 are labeled as RSBLKs and the SBs SB#3, SB#25 and SB#310 are labeled as FCSBLK.

In the second stage, the flash controller 130 obtains one or more H2F sub-tables associated with the valid pages in the RSBLKs, and scans the obtained H2F sub-table(s) one by one. In each scanning, the flash controller 130 detects valid pages stored in the RSBLKs and the FCSBLKs in the order of the logical addresses of the scanned H2F sub-table, and appends records in the GC table, in which each record stores information indicating that the user data of the designated physical page in the designated RSBLK or FCSBLK is stored in the designated physical page in the DBLK. The total number of records in the GC table for the valid pages of the FCSBLKs does not exceed DIFF.

Figure 8A:
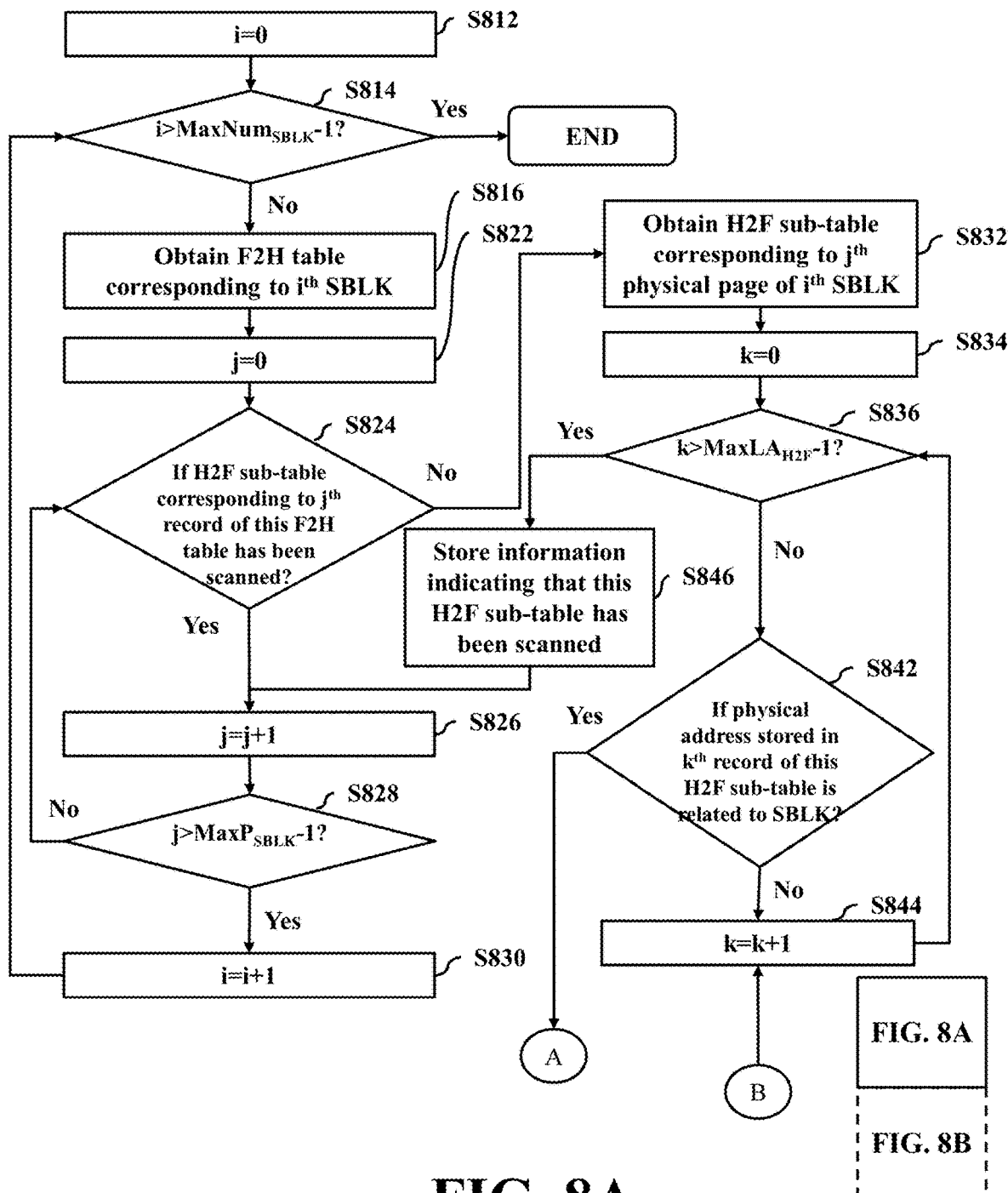
FIGS. 8A and 8B are flowcharts illustrating a method for arranging valid user data in the DBLK, which is implemented in the second stage, according to an embodiment of the invention.
Figure 8B:
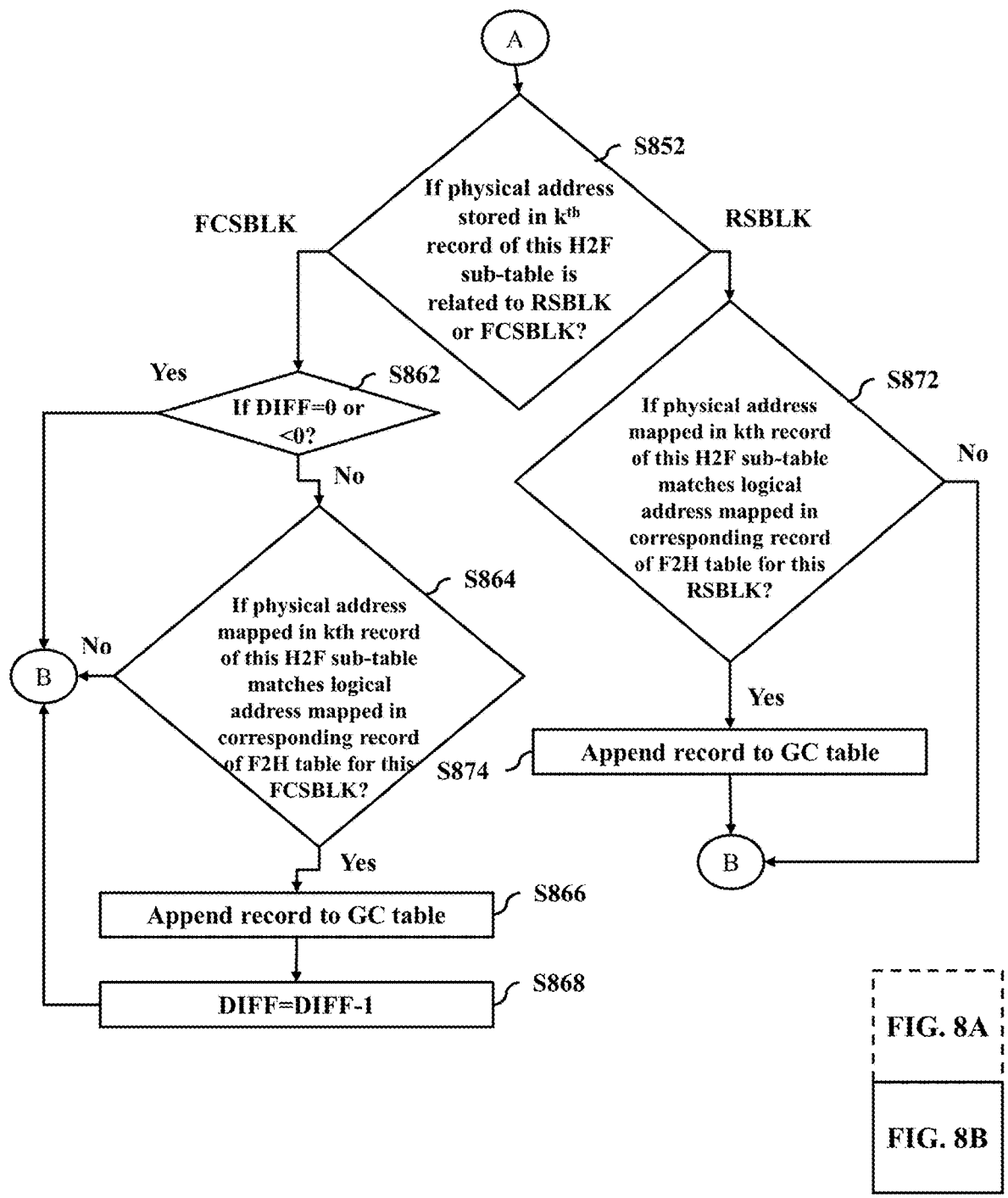

Refer to FIGS. 8A and 8B illustrating a method for arranging valid user data in the DBLK, which is implemented in the second stage. The processing unit 134 when loading the executing program code of the FTL generates the GC table according to the content of F2H tables corresponding to the SBLKs and the content of H2F sub-tables corresponding to the RSBLKs. The details are as follows:

Step S812: The variables i is set to 0. The processing unit 134 uses the variable i to record the specific number of the SBLK that is processed currently.

Step S814: It is determined whether the variable i is greater than the preset number $MaxNum_{SBLK}$ minus one. If so, it means that all SBLKs have been processed completely and the process ends. Otherwise, the process proceeds to step S816.

Step S816: The F2H table of the $i^{th}$ SBLK is obtained.

Step S822: The variable j is set to 0. The processing unit 134 uses the variable j to record the specific number of the record (i.e. the physical page number of this SBLK) that is processed currently in the F2H table.

Step S824: It is determined whether the H2F sub-table corresponding to the $j^{th}$ record of this F2H table has been scanned. If so, the process proceeds to step S826. Otherwise, the process proceeds to step S832. The processing unit 134 may maintain the information indicating whether each H2F sub-table has been scanned in a well-known data structure, such as a data table, a bitmap, etc., in the RAM 136. Initially, the bitmap stores information indicating that each H2F sub-table hasn't been scanned. For example, referring to FIG. 4, when the $j^{th}$ record of the F2H table stores LBA#8200, this record maps to the H2F sub-table 430#2. The processing unit 134 may query the value of the $2^{nd}$ bit in the bitmap to determine whether the H2F sub-table 430#2 has been scanned. If the value of the $2^{nd}$ bit is "1", then the H2F sub-table 430#2 has been scanned. If the value of the $2^{nd}$ bit is "0", then the H2F sub-table 430#2 hasn't been scanned.

Step S826: The variable j is increased by one.

Step S828: It is determined whether the variable j is greater than $MaxP_{SBLK}$ minus one, in which $MaxP_{SBLK}$ is a constant to represent the maximum number of the physical pages that can be stored in one SBLK (or one data block). If so, it means that all physical pages in this SBLK have been processed and the process proceeds to step S830. Otherwise, the process proceeds to step S822.

Step S830: The variable i is increased by one.

Step S832: The H2F sub-table corresponding to the $j^{th}$ physical page of this SBLK (i.e. the $i^{th}$ SBLK) is obtained. For example, referring to FIG. 4, when the $j^{th}$ record of the F2H table stores LBA#300, this record maps to the H2F sub-table 430#0.

Step S834: The variable k is set to 0. The processing unit 134 uses the variable k to record the specific number of the record that is processed currently in this H2F sub-table and uses the record number k to calculate a logical address. For example, $LBA_k$=H2FStart+k, in which $LBA_k$ indicates the LBA number stored in the $k^{th}$ record of this H2F sub-table and H2FStart is a preset constant to indicate the starting LBA number of this H2F sub-table. Referring to FIG. 4, the starting LBA number of the H2F sub-table 430#0 is LBA#0, the starting LBA number of the H2F sub-table 430#1 is LBA#4096, and so on.

Step S836: It is determined whether the variable k is greater than $MaxLA_{H2F}$ minus one, in which $MaxLA_{H2F}$ is a constant to represent the maximum number of the records that can be stored in one H2F sub-table. If so, it means that all records in this H2F sub-table have been processed completely and the process proceeds to step S846. Otherwise, the process proceeds to step S842.

Step S842: It is determined whether the physical address stored in the $k^{th}$ record of this H2F sub-table is related to a SBLK. If so, the process proceeds to step S852. Otherwise, it means that the GC process excludes the data block corresponding to the physical address stored in the $k^{th}$ record of this H2F sub-table, and the process proceeds to step S844.

Step S844: The variable k is increased by one.

Step S846: The information indicating that this H2F sub-table has been scanned. For example, referring to FIG. 4, when the H2F sub-table 430#2 has been scanned completely, the processing unit 134 may update the value of the $2^{nd}$ bit in the bitmap with "1".

Step S852: It is determined whether the physical address stored in the $k^{th}$ record of this H2F sub-table is related to a RSBLK or a FCSBLK. If it is related to the RSBLK, the process proceeds to step S872. If it is related to the FCSBLK, the process proceeds to step S862.

Step S862: It is determined whether DIFF is equal to or less than 0. If so, it means that no valid page is allowed to be collected from the FCSBLK and the process proceeds to step S844. Otherwise, the process proceeds to step S864. Details of the initiation of DIFF may refer to the description of step S780.

Step S864: It is determined whether the physical address mapped in the $k^{th}$ record of this H2F sub-table matches the logical address mapped in the corresponding record of the F2H table for this FCSBLK. If so, the process proceeds to step S866. Otherwise, the process proceeds to step S844.

Step S866: A record is append to the GC table to instruct the user data of the logical address mapped in the corresponding record of the F2H table for this FCSBLK to be reprogrammed into the $0^{th}$ (or the next) physical page of the DBLK.

Step S868: The variable DIFF is decreased by one.

Step S872: It is determined whether the physical address mapped in the $k^{th}$ record of this H2F sub-table matches the logical address mapped in the corresponding record of the F2H table for this RSBLK. If so, the process proceeds to step S874. Otherwise, the process proceeds to step S844.

Step S874: A record is append to the GC table to instruct the user data of the logical address mapped in the corresponding record of the F2H table for this RSBLK to be reprogrammed into the $0^{th}$ (or the next) physical page of the DBLK.

Figure 9:
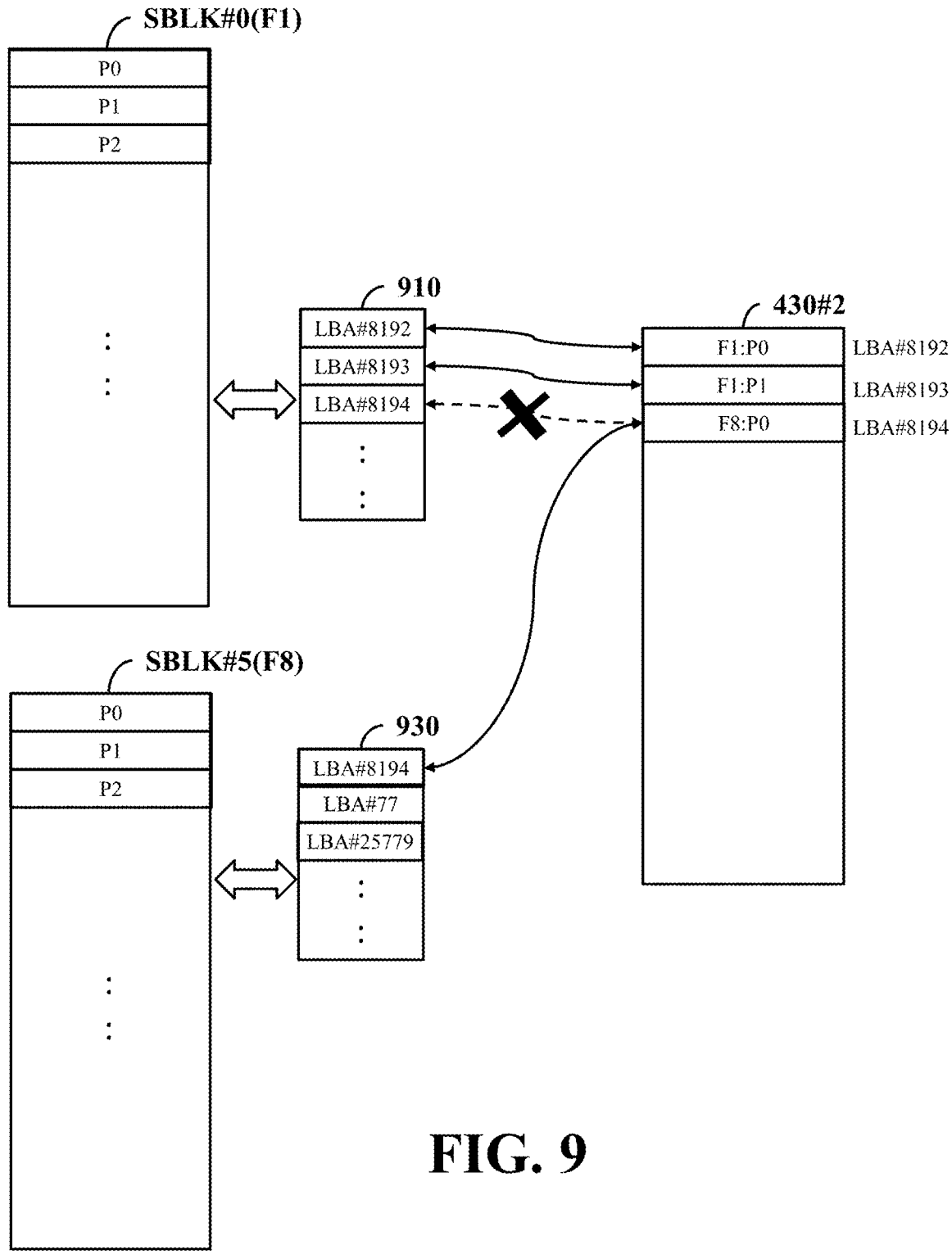
FIG. 9 is a schematic diagram for determining valid pages according to the content of the H2F sub-tables and the flash-address to host-address mapping (F2H) tables according to an embodiment of the invention.

Regarding steps S864 and S872, for example, refer to FIG. 9. SBLK#0 (i.e. the $1^{st}$ SB "F1") contains physical pages "P0", "P1", "P2", and so on, SBLK#5 (i.e. the $8^{th}$ SB "F8") contains physical pages "P0", "P1", "P2", and so on. The F2H table 910 is stored in the last physical page of SBLK#0 and the F2H table 930 is stored in the last physical page of SBLK#5. The content of F2H table 910 indicates that the $0^{th}$ physical page thereof stores the user data of LBA#8192, the $1^{st}$ physical page thereof stores the user data of LBA#8193 and the $2^{nd}$ physical page thereof stores the user data of LBA#8194. The content of F2H table 930 indicates that the $0^{th}$ physical page thereof stores the user data of LBA#8194, the $1^{st}$ physical page thereof stores the user data of LBA#77 and the $2^{nd}$ physical page thereof stores the user data of LBA#25779. The H2F sub-table 430#2 contains the physical addresses mapped for LBA#8192 to LBA#12287. Specifically, the user data of LBA#8192 is stored in the physical page "P0" of the SB "F1", the user data of LBA#8193 is stored in the physical page "P1" of the SB "F1" and the user data of LBA#8194 is stored in the physical page "P0" of the SB "F8". The physical address "F1: P0" stored in the $0^{th}$ record (corresponding to LBA#8192) of the H2F sub-table 430#2 matches the logical address "LBA#8192" stored in the $0^{th}$ record of the F2H table 910. The physical address "F1: P1" stored in the $1^{st}$ record (corresponding to LBA#8193) of the H2F sub-table 430#2 matches the logical address "LBA#8193" stored in the $1^{st}$ record of the F2H table 910. The physical address "F8: P0" stored in the $2^{nd}$ record (corresponding to LBA#8194) of the H2F sub-table 430#2 matches the logical address "LBA#8194" stored in the $0^{th}$ record of the F2H table 930. But, the logical address "LBA#8194" stored in the $2^{nd}$ record of the F2H table 930 does not match the physical address "F8: P0" stored in the $2^{nd}$ record (corresponding to LBA#8194) of the H2F sub-table 430#2.

For example, with the references made to FIG. 9, the processing unit 134 may store the exemplary GC table as shown in Table 2:

TABLE 2

| Source Location | Destination Location |
|---|---|
| F1:P0 | DBLK:P0 |
| F1:P1 | DBLK:P1 |
| F8:P0 | DBLK:P2 |

The GC table contains three records and each record stores information indicating that the user data in the designated physical page of the designated data block to be reprogrammed into the designated physical page of the DBLK.

It is to be noted that the total number of records associated with FCSBLK in the GC table is less than or equal to DIFF, which is calculated in step S780.

In the third stage, the flash controller 130 reprograms the user data of the designated physical page of the designated data block in the flash module 150 into the designated physical page of the DBLK in the flash module 150 according to each record of the GC table. After the reprogramming, the flash controller 130 updates the content of corresponding records of all H2F sub-table(s) obtained in step S832 to reflect the migration results for the user data of the designated logical addresses.

In some embodiments, after the reprogramming, the processing unit 134 updates the VPC table to set the VPC of each RSBLK to 0 and to subtract the amount of physical pages that have been moved in each FCSBLK from the VPC of this FCSBLK to reflect the results produced after the GC process.

In some embodiments of the user data migration, the processing unit 134 drives the flash I/F 139 to read the user data from the designated physical page of the designated data block in the flash module 150 and drives the flash I/F 139 to program the read user data into the designated physical page of the DBLK in the flash module 150 according to each record of the GC table.

In alternative embodiments of the user data migration, the processing unit 134 drives the flash I/F 139 to issue a proper command to the flash module 150 according to each record of the GC table, which instructs the flash module 150 to program the user data of the designated physical page of the designated data block into the designated physical page of the DBLK in the internal-copy manner.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smart-phone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention. Each element of FIGS. 1-3 is composed of various circuitries and arranged to operably perform the aforementioned operations. While the process flows described in FIGS. 7 and 8A-8B include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for garbage collection (GC) in a flash memory device, performed by a processing unit, comprising:
   sorting a plurality of data blocks according to a plurality of valid page counts (VPCs) of the data blocks and selecting a preset number of sorted data blocks starting from a data block with a smallest valid page count (VPC) as source blocks (SBLKs);
   calculating accumulated VPCs of sorted SBLKs from a source block (SBLK) with the smallest VPC to a SBLK with a largest VPC until a calculated accumulated VPC exceeds a total number of physical pages in one destination block (DBLK) as a hit accumulated VPC, wherein every accumulated VPC is calculated by an equation:

$$VPC_{total,j} = \Sigma_{i=0}^{j} VPC_i,$$

j represents a serial number of a sorted SBLK, $VPC_i$ represents a VPC of an $i^{th}$ sorted SBLK, $VPC_{total,j}$ represents an accumulated VPC of a $j^{th}$ sorted SBLK;
   finding a SBLK associated with the hit accumulated VPC that is a first one exceeding the total number of physical pages in one DBLK;
   labeling a found SBLK and its subsequent SBLKs as first-type SBLKs;
   labeling SBLKs other than the first-type SBLKs as second-type SBLKs;
   obtaining one or more host-address to flash-address mapping (H2F) sub-tables corresponding to first valid pages stored in the second-type SBLKs;
   in a scanning for each H2F sub-table, detecting a plurality of second valid pages stored in the first-type SBLKs and the second-type SBLKs in an order of logical addresses of the each H2F sub-table and appending a plurality of records to a garbage collection (GC) table for the second valid pages, wherein each record stores information indicating that user data of a designated physical page in a designated first-type SBLK or a designated second-type SBLK to be programmed into a designated physical page of the DBLK, and a total number of the records in the GC table, which are associated with the first-type SBLKs, is less than or equal to a difference subtracting a total number of VPCs of the second-type SBLKs from the total number of physical pages in the DBLK; and
   reprogramming the user data of the designated physical page in the designated first-type SBLK or the designated second-type SBLK into the designated physical page of the DBLK according to each record of the GC table, thereby enabling the second-type SBLKs after being erased to store new user data.

2. The method of claim 1, comprising:
   reading the VPC of each data block from a metadata region of a designated physical page of the each data block in a flash module.

3. The method of claim 1, comprising:
   reading the VPC of each data block from a metadata region of a last physical page of the each data block in a flash module.

4. The method of claim 3, wherein the threshold is set to 1;
   reading a VPC table from a designated physical address of a flash module; and
   obtaining the VPCs of the data blocks from the VPC table.

5. The method of claim 1, wherein the preset number of the sorted data blocks is 16.

6. The method of claim 1, wherein each H2F sub-table stores physical-address information mapped from each logical address in an order of logical addresses.

7. The method of claim 6, wherein each logical address is represented by a logical block address (LBA) number.

8. A non-transitory computer-readable storage medium having stored therein program code that, when loaded and executed by a processing unit, causes the processing unit to:
   sort a plurality of data blocks according to a plurality of valid page counts (VPCs) of a data blocks and select a preset number of sorted data blocks starting from the data block with a smallest valid page count (VPC) as source blocks (SBLKs);
   calculate accumulated VPCs of sorted SBLKs from a source block (SBLK) with the smallest VPC to a SBLK with a largest VPC until a calculated accumulated VPC exceeds a total number of physical pages in one destination block (DBLK) as a hit accumulated VPC, wherein every accumulated VPC is calculated by an equation:

$$VPC_{total,j} = \Sigma_{i=0}^{j} VPC_i,$$

j represents a serial number of a sorted SBLK, $VPC_i$ represents a VPC of an $i^{th}$ sorted SBLK, $VPC_{total,j}$ represents an accumulated VPC of a $j^{th}$ sorted SBLK;
   find a SBLK associated with the hit accumulated VPC that is a first one exceeding the total number of physical pages in one DBLK;
   label a found SBLK and its subsequent SBLKs as first-type SBLKs;
   label SBLKs other than the first-type SBLKs as second-type SBLKs;
   obtain one or more host-address to flash-address mapping (H2F) sub-tables corresponding to first valid pages stored in the second-type SBLKs;
   in a scanning for each H2F sub-table, detect a plurality of second valid pages stored in the first-type SBLKs and the second-type SBLKs in an order of logical addresses of the each H2F sub-table and append a plurality of records to a garbage collection (GC) table for the second valid pages, wherein each record stores information indicating that user data of a designated physical page in a designated first-type SBLK or a designated second-type SBLK to be programmed into a designated physical page of the DBLK, and a total number of the records in the GC table, which are associated with the first-type SBLKs, is less than or equal to a difference subtracting a total number of VPCs of the second-type SBLKs from the total number of physical pages in the DBLK; and
   reprogram the user data of the designated physical page in the designated first-type SBLK or the designated second-type SBLK into the designated physical page of the DBLK according to each record of the GC table, thereby enabling the second-type SBLKs after being erased to store new user data.

9. The non-transitory computer-readable storage medium of claim 8, wherein the program code that, when loaded and executed by the processing unit, causes the processing unit to:
   read the VPC of each data block from a metadata region of a designated physical page of the each data block in a flash module.

10. The non-transitory computer-readable storage medium of claim 8, wherein the program code that, when loaded and executed by the processing unit, causes the processing unit to:
read the VPC of each data block from a metadata region of a last physical page of the each data block in a flash module.

11. The non-transitory computer-readable storage medium of claim 8, wherein the program code that, when loaded and executed by the processing unit, causes the processing unit to:
read a VPC table from a designated physical address of a flash module; and
obtain the VPCs of the data blocks from the VPC table.

12. The non-transitory computer-readable storage medium of claim 8, wherein the preset number of the sorted data blocks is 16.

13. The non-transitory computer-readable storage medium of claim 8, wherein each H2F sub-table stores physical-address information mapped from each logical address in an order of logical addresses and each logical address is represented by a logical block address (LBA) number.

14. An apparatus for garbage collection (GC) in a flash memory device, comprising:
a flash interface (I/F), coupled to a flash module; and
a processing unit, coupled to the flash I/F, arranged operably to: sort a plurality of data blocks according to a plurality of valid page counts (VPCs) of the data blocks and select a preset number of sorted data blocks starting from a data block with a smallest valid page count (VPC) as source blocks (SBLKs); calculate accumulated VPCs of sorted SBLKs from a source block (SBLK) with the smallest VPC to a SBLK with a largest VPC until a calculated accumulated VPC exceeds a total number of physical pages in one destination block (DBLK) as a hit accumulated VPC, wherein every accumulated VPC is calculated by an equation:

$$VPC_{total,j}=\Sigma_{i=0}^{j}VPC_i,$$

j represents a serial number of a sorted SBLK, $VPC_i$ represents a VPC of an $i^{th}$ sorted SBLK, $VPC_{total,j}$ represents an accumulated VPC of a $j^{th}$ sorted SBLK; find a SBLK associated with the hit accumulated VPC that is a first one exceeding the total number of physical pages in one DBLK; label a found SBLK and its subsequent SBLKs as first-type SBLKs; label SBLKs other than the first-type SBLKs as second-type SBLKs; obtain one or more host-address to flash-address mapping (H2F) sub-tables corresponding to first valid pages stored in the second-type SBLKs; in a scanning for each H2F sub-table, detect a plurality of second valid pages stored in the first-type SBLKs and the second-type SBLKs in an order of logical addresses of the each H2F sub-table and append a plurality of records to a garbage collection (GC) table for the second valid pages, wherein each record stores information indicating that user data of a designated physical page in a designated first-type SBLK or a designated second-type SBLK to be programmed into a designated physical page of the DBLK, and a total number of the records in the GC table, which are associated with the first-type SBLKs, is less than or equal to a difference subtracting a total number of VPCs of the second-type SBLKs from the total number of physical pages in the DBLK; and drive the flash I/F to program the user data of the designated physical page in the designated first-type SBLK or the designated second-type SBLK into the designated physical page of the DBLK in the flash module according to each record of the GC table, thereby enabling the second-type SBLKs after being erased to store new user data.

15. The apparatus of claim 14, wherein the processing unit is arranged operably to: drive the flash I/F to read the VPC of each data block from a metadata region of a designated physical page of the each data block in the flash module.

16. The apparatus of claim 14, wherein the processing unit is arranged operably to: drive the flash I/F to read the VPC of each data block from a metadata region of a last physical page of the each data block in the flash module.

17. The apparatus of claim 14, wherein the processing unit is arranged operably to: drive the flash I/F to read a VPC table from a designated physical address of the flash module; and obtain the VPCs of the data blocks from the VPC table.

18. The apparatus of claim 14, wherein the preset number of the sorted data blocks is 16.

19. The apparatus of claim 14, wherein each H2F sub-table stores physical-address information mapped from each logical address in an order of logical addresses.

20. The apparatus of claim 19, wherein each logical address is represented by a logical block address (LBA) number.

* * * * *